United States Patent
Finch et al.

(10) Patent No.: US 9,175,121 B2
(45) Date of Patent: Nov. 3, 2015

(54) RESINS OF B-HYDROXY PROPYL GAMMA-POLYOXYALKYLENE ETHERS AND POLYMERS THEREOF

(71) Applicant: Rohm and Haas Company, Philadelphia, PA (US)

(72) Inventors: William C. Finch, Ambler, PA (US); Sudhir M. Mulik, North Wales, PA (US); C. Damien Rodowski, Downingtown, PA (US); Barry Weinstein, Dresher, PA (US)

(73) Assignee: Rolm and Haas Company, Philadelphia, PA (US)

(*) Notice: Subject to any disclaimer, the term of this patent is extended or adjusted under 35 U.S.C. 154(b) by 0 days.

(21) Appl. No.: 14/353,821

(22) PCT Filed: Oct. 25, 2012

(86) PCT No.: PCT/US2012/061777
§ 371 (c)(1),
(2) Date: Apr. 24, 2014

(87) PCT Pub. No.: WO2013/066696
PCT Pub. Date: May 10, 2013

(65) Prior Publication Data
US 2014/0303317 A1    Oct. 9, 2014

Related U.S. Application Data

(60) Provisional application No. 61/552,763, filed on Oct. 28, 2011.

(51) Int. Cl.
C08F 220/28    (2006.01)
C08F 8/14       (2006.01)
C08F 8/44       (2006.01)
C08F 120/06    (2006.01)

(52) U.S. Cl.
CPC ......... C08F 220/28 (2013.01); C08F 2220/285 (2013.01)

(58) Field of Classification Search
CPC ..... C08F 220/28; C08F 8/14; C08F 2220/285
USPC ........... 524/556; 525/330.1, 385; 526/320
See application file for complete search history.

(56) References Cited

U.S. PATENT DOCUMENTS

| | | | |
|---|---|---|---|
| 3,178,380 A * | 4/1965 | Porret | 427/393.4 |
| 4,663,363 A | 5/1987 | Blount | |
| 5,130,369 A | 7/1992 | Hughes et al. | |
| 5,532,289 A | 7/1996 | Benz et al. | |
| 5,670,578 A | 9/1997 | Shawl | |
| 7,906,591 B2 * | 3/2011 | Weinstein et al. | 525/330.1 |

FOREIGN PATENT DOCUMENTS

| | | |
|---|---|---|
| JP | 6070353 A | 4/1985 |
| JP | 2862357 B2 | 3/1999 |

OTHER PUBLICATIONS

Lee et al., "Synthesis, Characterization, Antitumor Activity of Pluronic Mimicking Copolymer Micelles Conjugated with Doxorubicin via Acid-Gleavable Linkage," Bioconjugate Chem. 2008, pp. 525-531.
Sung et al., "Effect of Polyethylene Glycol on Gene Delivery of Polyethylenimine," Biol. Pharm. Bull. 26(4) 2003, pp. 492-500.
Wen et al., "Amphipathic hyperbranched polymeric thioxanthone photoinitiators (AHPTXs): Synthesis, characterization and photoinitiated polymerization," Polymer 50, 2009, pp. 3917-3923.
Cho et al., Synthesis and characterization of poly(ethylene glycol) grafted poly(L-lactide), Macromol. Rapid Commun. 20, 1999, pp. 598-601.

* cited by examiner

*Primary Examiner* — Michael M Bernshteyn
(74) *Attorney, Agent, or Firm* — Andrew E. C. Merriam

(57) ABSTRACT

The present invention provides aqueous compositions comprising β-hydroxy propyl gamma-polyoxyalkylene ether functional resins chosen from (poly)oxyalkylene ether β-hydroxy propyl (meth)acrylates, maleates and itaconates, water soluble copolymers thereof, and mixtures thereof. The water soluble copolymers are comb polymers and (meth)acrylate, maleate and itaconate monomer resins can be addition polymerized to form comb polymers suitable for many uses, such as superplasticizers, dispersants, detergents and floor care compositions. In addition, the present invention provides methods of making the resins by reacting in water or aqueous solvent one or more reactant a) a glycidyl polyether or glycidyl ether, optionally having an alkyl or aryl end group with one or more reactant b) a carboxylate anion containing vinyl compound or polymer, preferably a polymer such as poly (meth)acrylic acid. The methods enable simple formation of comb polymers.

9 Claims, No Drawings

RESINS OF B-HYDROXY PROPYL GAMMA-POLYOXYALKYLENE ETHERS AND POLYMERS THEREOF

The present invention relates to compositions comprising resinous β-hydroxy propyl polyether functional compounds and water soluble polymers thereof. More particularly, it relates to β-hydroxy propyl gamma-polyoxyalkylene ether (meth)acrylates, water soluble copolymers thereof and alkali soluble copolymers thereof, as well as to methods for making them in a single process.

Known water reducing superplasticizers for cement admixtures include alkyl capped poly(ethylene glycol)esters of poly(meth)acrylic acid. They are manufactured via copolymerization of methoxypoly(ethyleneglycol) (meth)acrylate (PEG(M)A) macromonomers with methacrylic acid (MAA) or acrylic acid (AA) in a macromonomer approach. Alternatively, these comb polycarboxylate esters can be obtained by esterification of p-MAA, p-AA or copolymers containing a high mol fraction of acid monomer with methyl capped polyglycols, such as, for example, Carbowax™ polyols (The Dow Chemical Co., Midland, Mich.) or Neodol™ polyols (Shell Chemicals, Houston, Tex.) ethoxylated fatty alcohols, such as, for example, Acusol™ 102 polyols (Dow Chemical) in a polymer modification approach.

The macromonomer approach suffers from the high cost and limited availability of the macromonomer, especially in the construction industry for use in making superplasticizers. The polymer modification approach suffers from the need for esterification catalysts and investment in both polymerization and modification equipment to support a two step synthesis for the polymer. For example, U.S. Pat. No. 7,906,591 to Weinstein et al. discloses methods for making esterified or amidated polycarboxy polymers that can be useful as, among other things, superplasticizers. The Weinstein methods comprise modifying a polymer or copolymer containing acid groups and a hypophosphite residue by reacting it with an monoalkyl polyglycol ether, a monoalkyl polyglycolamine or an ethanolamine compound. The Weinstein methods require a previously formed polymer. The methods produce water of reaction which can be removed in flux.

The present inventors have sought to solve the problem of providing a novel and easy to make β-hydroxy propyl polyether functional resinous composition, including a monomer and a polymer in a single reactor to result in compositions that can be readily used as comb polymers, dispersants or water soluble polymers for various known uses or polymerized to form such comb polymers.

STATEMENT OF THE INVENTION

In accordance with the present invention, compositions comprise β-hydroxy propyl gamma-polyoxyalkylene ether functional resins chosen from (poly)oxyalkylene ether β-hydroxy propyl (meth)acrylates, maleates and itaconates, water soluble copolymers thereof, alkali soluble copolymers thereof, and mixtures thereof.

The resins of the present invention may be chosen from (i) (poly)oxyalkylene ether β-hydroxy propyl (meth)acrylates, maleates and itaconates of formula I, below, (ii) water soluble or alkali soluble copolymers polymerized from poly)oxyalkylene ether β-hydroxy propyl (meth)acrylates, maleates and itaconates of formula I and an additional polymerizable co-monomer and (iii) mixtures thereof,

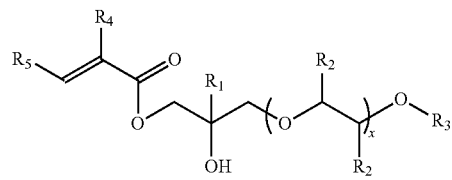

wherein in formula I $R_1$ is hydrogen, 1 to 4 carbon alkyl or phenyl, preferably, H or methyl; each $R_2$ is independently hydrogen, 1 to 4 carbon atom alkyl, or an oxyalkylene radical of formula II preferably, H;

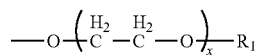

$R_3$ is hydrogen, 1 to 50 carbon alkyl, benzyl ($C_7H_7$), or alkylbenzyl, preferably 1 to 10 carbon alkyl; $R_4$ is hydrogen, methyl or —$CH_2COOH$, or methylene carboxyl salt such as —$CH_2COONa$; and $R_5$ is hydrogen, carboxyl, —$C(O)NH_2$ or metal carboxylate salts, preferably, H; and x is from 1 to 200, preferably from 2 to 120, or, preferably, up to 50.

The water soluble copolymer of the present invention can be an aqueous solution polymer and the alkali soluble copolymer of the present invention can be an aqueous emulsion copolymer such as one having up to 30 wt. % of monomers which do not contain a water-dispersible functional group, such as a carboxylic, anhydride, salt, amide, alcohol or amine group, for example, the monomers of groups (iii) and (iv) in the following paragraph. Preferably, the water soluble copolymer or alkali soluble copolymer is a carboxylate anion containing polymer.

The water soluble copolymers thereof and alkali soluble copolymers of the present invention can be polymerized from the monomer of formula I, such as a (meth)acrylate, maleate or itaconate monomer, with an addition polymerizable monomer, such as an ethylenically unsaturated vinyl monomer having one or more of (i) a carboxyl functional group or its salt, such as, for example, acrylic acid and methacrylic acid and salts thereof; (ii) two carboxyl functional groups or their salts, their salts or anhydrides, such as maleic or itaconic acid; (iii) a 1 to 18 carbon alkyl carboxylate ester group, such as methyl methacrylate or butyl acrylate; (iv) carboxamide group, such as (meth)acrylamide; or (v) a phenyl ester, benzyl ester, or phenyl group, such as styrene or α-methyl styrene.

The water soluble copolymer of the present invention can be the copolymerization product of up to 95 wt. % of ethylenically unsaturated monomers not containing carboxyl groups or their salts. In the carboxyl functional monomer, preferred carboxyl salts are alkali(ne earth) metal salts, such as sodium or potassium salts, and divalent metal salts, such as zinc salts, magnesium and calcium salts. For floor care applications, the preferred salts are divalent metal salts.

The water soluble copolymer of the present invention may have a weight average molecular weight of from 1,000 to 250,000 or, preferably, 2,000 or more, or, preferably, 100,000 or less, or, preferably, 4,000 or more. For floor care applications, the preferred weight average molecular weight ranges from 15,000 to 200,000. For other applications, such as dispersants and superplasticizer applications, the preferred weight average molecular weight may range from 2,000 to 20,000, or, preferably, 15,000 or less.

In accordance with the present invention, any of the above described β-hydroxy propyl gamma-polyoxyalkylene ether functional resins (monomers, water soluble copolymers or alkali soluble copolymers) can comprise an aqueous composition or can comprise a dry composition, such as in the form of an anhydride of the copolymer.

The present invention further comprises methods of making β-hydroxy propyl polyether functional resins chosen from (poly)oxyalkylene ether β-hydroxy propyl(meth)acrylates, maleates and itaconates, water soluble copolymers thereof or alkali soluble copolymers thereof comprising reacting in water or aqueous solvent one or more reactant (a) i) the reaction product of epihalohydrin, e.g. epichlorohydrin, with one or more of a glycol, such as ethylene glycol, an oligoglycol, a glycol alkyl ether, such as ethylene glycol butyl ether, polyglycol alkyl ether, such as diethylene glycol butyl ether, a glycol alkyl aryl ether, a polyglycol alkyl aryl ether, a glycol aryl ether or a polyglycol aryl ether, or ii) a glycidyl alkyl ether, glycidyl alkyl polyether, glycidyl aryl ether or glycidyl aryl polyether with one or more reactant (b) a carboxylate anion containing vinyl compound or polymer, preferably, a polymer, wherein the carboxylate anion containing vinyl compound or polymer can be formed by adding a base to a carboxyl group containing vinyl compound or polymer in water or aqueous solvent, wherein in reactant (a) any alkyl group can have from 1 to 50 carbon atoms, preferably from 1 to 10 carbon atoms, most preferably, methyl, and any aryl group can be aryl or alkylaryl having from 5 to 40 carbon atoms, preferably, from 6 to 12 carbon atoms, such as, for example, $CH_2$benzyl and phenyl.

The carboxylate anion containing vinyl compound or polymer can be formed by adding a base to a carboxyl group containing vinyl compound or polymer in water or aqueous solvent.

When the β-hydroxy propyl gamma-polyoxyalkylene ether functional resins of the present invention are (meth)acrylates, maleates or itaconates, then the methods of the present invention may further comprise addition copolymerizing the resulting (poly)oxyalkylene ether β-hydroxy propyl (meth)acrylate, maleate and/or itaconate monomer with a comonomer such as an ethylenically unsaturated acid, acid salt, amide or vinyl monomer. In the methods of the present invention wherein reactant (b) is a carboxylate anion containing polymer, preferred polymers are polyacrylic acid, polymethacrylic acid, copolymers thereof, and salts and partial salts of any of these.

In the methods of the present invention, the solvent is an aqueous solvent which dissolves or disperses reactant (a). The term aqueous solvent also includes mixtures of water with one or more water miscible solvent having a flash point above 38° C. including but not limited to acetonitrile, dioxane, water and alcohol mixtures. Preferably, where the reactant (a) contains an alkyl group, and is not fully miscible in water the co-solvent is DMSO, acetonitrile, a (di)ethylene glycol $C_1$ to $C_4$ monoalkyl ether or glyme, such as diethylene glycol monomethyl ether, or a (di)ethylene glycol $C_1$ to $C_4$ dialkyl ether or diglyme, such as ethylene glycol dibutyl ether.

All ranges recited are inclusive and combinable. For example, a disclosed weight average molecular weight of from 1,000 to 250,000, or, preferably, 2,000 or more, or, preferably, 100,000 or less, or, preferably, 4,000 or more, would include such a molecular weight of from 1,000 to 25,0000, from 2,000 to 250,000, from 1,000 to 100,000, from 2,000 to 100,000, from 4,000 to 100,000, and from 4,000 to 250,000.

Unless otherwise indicated, all temperature and pressure units are room temperature and standard pressure.

All phrases comprising parentheses denote either or both of the included parenthetical matter and its absence. For example, the phrase "(meth)acrylate" includes, in the alternative, acrylate and methacrylate.

As used herein, the term "acid no." refers to milligrams of potassium hydroxide (KOH) required to neutralize 1 gram of sample.

As used herein, the term "aqueous solvent" means water mixed with a water miscible organic co-solvent having ≥30 wt. % water, based on the total weight of the aqueous solvent.

As used herein, the term "carboxylate anion" refers to any of $COO^-$ group, or a metal salt thereof.

As used herein, the term "reaction mixture" means the total of aqueous solvent, reactant a), reactant b), and added base.

As used herein, the term "resin" refers to a monomer or polymer which can react to form a covalent bond, such as by (co)polymerization or crosslinking, or an ionic bond, such as by forming a complex with an inorganic phase material like a silicate.

As used herein, the term "weight average molecular weight" means the molecular weight of a copolymer as determined by gel permeation chromatography (GPC) against poly(acrylic acid) standards.

As used herein, the term "wt. %" means weight percent.

In accordance with the present invention, a simple method is provided for making novel water soluble copolymers and precursor monomers. The β-hydroxy propyl polyether resins (polymers and monomers) of the present invention can serve in many applications where polymeric surfactants and rheology modifiers are useful. A particularly application of interest to this disclosure is rheology modification, water reducers for cement and concrete admixtures commonly referred to as plasticizers and superplasticizers (SPs). The β-hydroxy propyl polyether monomer of the present invention is a (meth) acrylic ester derived from the reaction of a glycidyl ether or oxirane alkyl or aryl(poly)ether compound with a partially neutralized aqueous solution of an carboxylate anion functional monomer and a (poly)glycol monoether. The β-hydroxy propyl polyether functional polymers of present invention can be obtain by a process of reacting the glycidyl ether or oxirane compound with a partially neutralized carboxylate anion functional copolymer and a (poly)glycol monoether. As the reaction is an addition reaction, there is no water of reaction. Thus, the aqueous resinous compositions of the present invention can be simply made in the drain tank of polymerization reactors or in other reactors that cannot do esterification, with no overhead (devolatilizer) system in the reactor.

In the methods of the present invention, presence of a carboxylate anion serves as the nucleophile that enables the addition reaction to the glycidyl ether or oxirane alkyl or aryl(poly)ether compound (a) and (b) a carboxylate anion containing compound to form an ester. The reaction can be carried out in the presence of a base, such as potassium hydroxide or ammonia or sodium hydroxide preferably, an alkali metal hydroxide to deprotonate the acid to an extent of 10 to 80 mol % of the total carboxyl groups present on the carboxylic acid containing vinyl compound or polymer, preferably from 30 to 70%. The amount of base is limited so that both free carboxylic acid and neutralized carboxylate is present; a volatile base such as ammonia can also be used but is not preferred.

In the addition reaction of reactants (a) and (b) according to the present invention, the total amount of base plus moles glycidyl ether or oxirane alkyl or aryl(poly)ether compound reactant moles a) should be less than the total number of molar equivalents of the carboxylic acid containing vinyl monomer or polymer in reactant (b). Accordingly, the ratio of equivalents of glycidyl or oxirane groups to carboxylate anion groups present in the reaction mixture should range from 20:1 to 1:20, or, preferably from 0.10:1 to 1:10, or more preferably, 3:1 to 1:5. In this reaction, carboxylate anion is a carboxylate salt or free negatively charged carboxy anion.

The reaction can take place with or without heating to up to the boiling point of the aqueous solvent or water for a period of from 30 minutes to 72 h. As is conventional, heating shortens the reaction time.

To insure reaction of reactant (a) and reactant (b), the solids of all reactants in the aqueous solvent should not exceed 50 wt. % and are, preferably, 10 to 40 wt. %, based on the total weight of the reaction mixture.

According to the present invention, where the reaction product is β-hydroxy propyl polyether functional monomer, the product monomer can be copolymerized with an ethylenically unsaturated copolymerizable monomer by aqueous addition polymerization by conventional methods. Addition polymerization can be carried out in aqueous solution where less than 30 wt. % of all monomers being copolymerized are not water soluble. Addition polymerization can be carried out via emulsion polymerization if 30 wt. % or more of the all monomers being polymerized are not water soluble. Conventional emulsion and solution initiators may be used, including, for example, persulfate salts, peroxy initiators, bis-nitrile initiators and redox pairs, such as peroxide-bisulfite pairs persulfate and bisulfate and isoascorbic acid and peroxide or persulfate, with or without the addition of a suitable mercaptan chain transfer agent, such as n-dodecyl mercaptan. Solution addition polymerization can also be conducted by chain transfer polymerization with hypophosphites and their salts, such as sodium hypophosphite or water soluble azo initiator with and without the addition of a mercaptan chain transfer agent, such as 3-mercpatopropionic acid or 2-mercaptoethanol.

In the addition reaction of the present invention, suitable reactants a) may include, for example, commercial monomethyl polyethylene glycol glycidyl ethers, CAS#40349-67-5, such as, the polyethylene glycol 5000 analogue available from BOC Sciences (Shirley, N.Y.). Suitable reactants are available from the reaction product of epichlorohydrin with diethylene glycol butyl ether (DBGE), the reaction product of an epihalodyrin with any polyglycol, such as diethylene glycol or polyethylene glycol having from 3 to 200 oxyethylene groups, alkylated polyglycol, such as methoxypolyethylene glycol, aryl polyglycol or alkylaryl polyglycols, as is conventionally performed in the presence of base catalysts, such as alkali metal hydroxides, metal hydrides such as sodium hydride and calcium hydride or any base with pKa above 15. These preparative methods are described in Macromol. Rapid Commun. 20, 598-601, (1999), Biol. Pharm. Bull. 26(4), 492-500 (2003) and Polymer 50, 3917-3923 (2009).

In the addition reaction of the present invention, suitable aqueous solvents include any water miscible solvent such as glymes, for example, ethylene glycol $C_3$ to $C_6$ monoalkyl ether, diethylene glycol $C_1$ to $C_6$ alkyl ether, or triethylene glycol $C_1$ to $C_6$ monoalkyl ether, or, preferably glymes with a flash point above 38° C. These include members of the E-Series and P-Series glycol ethers available from Dow Chemical Company such as Carbitol™ Methyl Carbitol, Butyl Carbitol, Propyl Cellosolve™, Butyl Cellosolve™, Methoxytriglycol, Dowanol™ DPM, Dowanol™ TPM, Dowanol™ PnP (The Dow Chemical Co., Midland, Mich.).

In the copolymerization of β-hydroxy propyl polyether functional monomer resins of the present invention, suitable comonomers for addition polymerization with the (poly)oxyalkylene ether β-hydroxy propyl(meth)acrylate may include ethylenically unsaturated acids, such as acrylic acid (AA), methacrylic acid (MAA), maleic acid (MA), itaconic acid (IA) and their salts; (meth)acrylamides; and hydrophobic vinyl monomers, including styrene, $C_1$ to $C_{10}$ alkyl(meth) acrylates, such as methyl methacrylate and butyl acrylate, $C_6$ to $C_{12}$ cycloalkyl(meth)acrylates, such as ethylhexyl acrylate, phenyl acrylate, and benzyl acrylate, and alkyl(meth)acrylamides sulfonated monomers such as styrene sulfonic acid and 2-acrylamido-2-methylpropane sulfonic acid and its salts, and 2-phosphoethylmethacrylate (PEM) and its salts.

The (poly)oxyalkylene ether β-hydroxy propyl (meth) acrylates water soluble copolymers of the present invention include solution polymers comprising carboxyl functional copolymers, such as poly(acrylic acid) or its salts, having β-hydroxy propyl polyether side chains. Such side chains may be present on from 0.5 to 55% of the monomer residues. These polymers are preferably form by use of a carboxylate anion containing polymer in the reaction of a) and b).

The (poly)oxyalkylene ether β-hydroxy propyl(meth)acrylate copolymers may also be emulsion copolymers having less than 30% carboxylic acid or salt copolymerized residues in the backbone.

The products of the present invention have many uses as comb polymers such as, for example, floor care treatment agents, builders in detergent compositions, polymeric dispersants, such as pigment dispersants for various coatings applications, thickeners, superplasticizers for cementitious materials, rheology modifiers and water reduces for gypsum slurries, suspending agents for suspending particulate materials in fluid media. In addition, such comb polymers find use as polymeric binders for a variety of coatings applications, such as for architectural coatings, marine coatings, paper coatings, can coatings, binders and coatings for textile and non-woven material, roll coatings, and the like. Further, comb polymers find use as tanning and retanning agents agents for leather manufacture and as rheology modifiers and thickeners, especially where an alkyl group on β-hydroxy propyl polyether side chain is hydrophobic, having from 8 to 18 carbon atoms, such as would be copolymerized from $C_{12}$ to $C_{18}$ alkyl or fatty (meth)acrylates, such as lauryl methacrylate (LMA) and cetyl(meth)acrylate.

The following examples illustrate the present invention. Unless otherwise indicated, all parts and percentages are by weight and all temperatures are in ° C.

The following reagents and solvents were used:

Diethylene glycol butyl ether (DGBE, >99.2%, CAS #112-34-5), potassium hydroxide pellets (KOH), methylene chloride and dimethyl sulfoxide were all obtained from Aldrich Chemicals Co. (Milwaukee, Wis.). Epichlorohydrin (99%), dioxane, methacrylic acid and NaOH (50% wt/wt solution) were purchased from Fischer Scientific Co. (Allentown, Pa.); and, a hypophosphite homotelomer of poly(methacrylic acid) having a weight average molecular weight of 6,000 neutralized to form a metal salt. The following analytical methods were used:

NMR spectroscopy: Was performed using a Bruker 500 MHz NMR (Bruker, Billerica, Mass.).

Gel permeation chromatography (GPC): Was performed with an Agilent 1100 HPLC system with isocratic pump, vacuum degasser, variable injection size autosampler, and column heater, or equivalent (GMI, Minneapolis, Minn.). Unless otherwise noted, 10 mg samples were dissolved into 5 mL of a 20 mM aqueous gel permeation chromatography (AQGPC) mobile phase solution. To make the mobile phase, 14.52 g sodium phosphate monobasic ($NaH_2PO_4$) and 14.08 g sodium phosphate dibasic ($NaH_2PO_4$) were dissolve into 11 L MilliQ™ HPLC water (Millipore, Inc., Allentown, Pa.), and were stirred to fully dissolve all solids. Then the resulting solution was adjusted to pH 7 with 0.5N sodium hydroxide. A flow marker was prepared by mixing, by weight, equal amounts of solid $NaH_2PO_4$ and $NaH_2PO_4$. After blending, 1.3 grams were dissolved into 1 liter of the 20 mM AQGPC mobile phase mix.

The following parameters were observed.

Detector: Agilent 1100 HPLC G1362A Refractive Index detector, or equivalent.

Software: Agilent ChemStation, version B.04.02 with Agilent GPC Addon version B.01.01.

Column Set: TOSOH Bioscience TSKgel G2500PWxl 7.8 mm ID×30 cm, 7 μm column (P/N 08020) with TOSOH Bioscience TSKgel GMPWxl 7.8 mm ID×30 cm, 13 μm (P/N 08025) from TOSOH Bioscience (TOSOH Bioscience, King of Prussia, Pa.)

Mobile Phase: 20 mM Phosphate buffer in MilliQ HPLC Water, pH ~7.0.

Flow Rate: 1.0 ml/minute; Injection volume: 20 μL

Column temp: 35° C.; Run time: 30 minutes

Standards: Polyacrylic acid, Na salts Mp 216 to Mp 1,100,000. Mp 900 to Mp1,100,000 standards from American Polymer Standards (American Polymer Standards, Mentor, Ohio)

Calibration: Polynomial fit using Agilent GPC-Addon software (Polynomial 4 used).

Injection concentration: 1-2 mg solids/mL 20 mM GPC mobile phase diluent.

Flow Marker: 30 mM phosphate

Aqueous Gel Permeation Chromatography/Mass Spectrometry (GPC-MS):

The methods for GPC, described above, were followed with the following exceptions:

Using a Bruker micrOTOF-Q™ II mass spectrometer (Bruker, Billerica, Mass.).

The mobile phase was made by dissolving 1.54 g ammonium acetate into 11 L MilliQ™ HPLC water, and stirring to fully dissolve all solids.

Liquid Chromatography/Mass Spectrometry (LC-MS):

For 2-((2-(2-butoxyethoxy)ethoxy)methyl)oxirane of Synthesis Example 1, this was performed using an Agilent 1100 HPLC system with vacuum degasser (G1322A), binary pump (G1312A), autosampler (G1313A), column heater (G1316A) and VWD (G1314A), or equivalent (GMI, Minneapolis, Minn.). Using for mass spec a Bruker micrOTOF-Q™ II mass spectrometer (Bruker, Billerica, Mass.)

Column Set: Agilent Zorbax Eclipse XDB-C18 3.0×150 mm, 5 μm

The following parameters were observed

Mobile Phase A: $H_2O$; Mobile Phase B: Acetonitrile

Flow Rate: 0.5 ml/min; Injection volume: 5 μL

Column temp: 25° C.

Mobile Phase A and B are allowed to flow in the following Gradient, set forth in Table 1, below:

TABLE 1

| Time (min) | % A | % B |
|---|---|---|
| 0 | 95 | 5 |
| 10 | 0 | 100 |
| 13 | 0 | 100 |
| 15 | 95 | 5 |
| 20 | 95 | 5 |

Flow Rate: ~250 ml/min

Ionization: Electrospray ionization in positive ion mode.

Mass range: 50-3000 Da

Matrix Assisted Laser Desorption Ionization Mass Spectrometry (MALDI-MS):

For 3-(2-(2-butoxyethoxy)ethoxy)-2-hydroxypropyl methacrylate of Synthesis Example 2, this was performed using a Bruker ultraflex MALDI equipped with a nitrogen laser (λ=337 nm) and as a MALDI Matrix 2, 5-Dihydroxybenzoic acid in THF @20 mg/ml.

The sample was dissolved in THF @-5 mg/ml. The sample solution was premixed with matrix solution at a ratio of 1:20. To facilitate ionization, NaI was doped into the sample/matrix mixture. 0.3 μl of the mixture was then placed on the sample target plate for MALDI-MS analysis.

SYNTHESIS EXAMPLE 1

Synthesis of 2-((2-(2-butoxyethoxy)ethoxy)methyl)oxirane $C_{11}H_{22}O_4$ mass 218.29 DGBE, 58.44 g (0.360 mol) was mixed with 91 ml of dimethyl sulfoxide at room temperature in a 3-neck flask equipped with stirrer and water condenser in water bath. Potassium hydroxide (KOH, 40.42 g, 0.721 mol) pellets was added to this mixture and stirred in. After complete dissolution of the KOH pellets, 100 g epichlorohydrin (1.081 mol) was added at a flow rate of 1.40 ml/min over a period of 1 h while maintaining the temperature at 30° C. After addition of epichlorohydrin the reaction was continued at 30° C. for 24 h. After 24 h, the reaction mixture was filtered and solid was washed with methylene chloride. The solvent from the filtrate was removed under reduced pressure. The residue was further partitioned between ethyl ether (2×200 ml) and brine (100 ml). The organic layers were combined and dried over MgSO4. 64.0 g of final product was isolated with yield of 81%.

TABLE 2

1H, 13C NMR spectra and peak assignments for 2-((2-(2 butoxyethoxy)ethoxy)methyl) oxirane

| 1H NMR | |
|---|---|
| Peaks (in ppm) | Assigned, appearance |
| 3.05 | 1H, m |
| 2.69 | 1H, m |
| 2.52 | 1H, m |
| 0.91 | 3H, m |

| 13C NMR | |
|---|---|
| Peaks (in ppm) | Assigned |
| 52.1 | 1C |
| 45.0 | 1C |
| 15.2 | 1C |

As shown in Table 2, above, the 1H NMR Peaks at 3.05 ppm, 2.69 ppm and 2.52 ppm are peaks associated with the proton of the oxirane ring formed. The peak at 0.91 ppm is associated with protons of the butyl group formed. Similarly, 13C NMR Peaks in shown in Table 2 at 52.1 ppm and 45.0 ppm are peaks associated with the carbon of an epoxy ring. The peak at 15.2 ppm is associated with a butyl group carbon. This analysis confirms synthesis of a 2-((2-(2 butoxyethoxy)ethoxy)methyl)oxirane reactant a).

TABLE 3

Mass spectrometry analysis for 2-((2-(2 butoxyethoxy)ethoxy)methyl)oxirane

| Molecular ions | Molecular mass |
|---|---|
| MH+ | 219.16 |
| $MNH_4$+ | 236.20 |
| MNa+ | 241.14 |

As shown in Table 3, above, a protonated molecular ion (MH+) peak at m/z 219.2 for 2-((2-(2 butoxyethoxy)ethoxy)methyl)oxirane is observed in mass spectroscopy analysis. The peaks at m/z 236.2 and 241.1 are sodiated (MNa+) and ammoniated ($MNH_4$+) molecular ion peaks respectively. This demonstrates successful synthesis of 2-((2-(2 butoxyethoxy)ethoxy)methyl)oxirane.

SYNTHESIS EXAMPLE 2

Synthesis of 3-(2-(2-butoxyethoxy)ethoxy)-2-hydroxypropyl methacrylate $C_{15}H_{28}O_6$)

A mixture (30/70 wt/wt % ratio) of dioxane (5.13 g) and distilled water (11.96 g) was prepared in a glass vial with a magnetic stirrer. Methacrylic acid (10.0 g, 0.116 mol) was added to this mixture followed with addition to sodium hydroxide (1.39 g, 0.035 mol). The solution was stirred for 10 min at room temperature until all sodium hydroxide was dissolved. The 2-((2-(2-butoxyethoxy)ethoxy)methyl)oxirane (7.60 g, 0.0348 mol) was added and the reaction mixture which was stirred at room temperature for another 10 min. The glass vial was heated in a preheated oven at 60° C. for 24 h. After 24 h, the vial was removed from oven and cooled to room temperature. The two layers formed were separated and the organic layer (top) was characterized. Since only 30 mol % of methacrylic acid was neutralized the remaining 70 mol % methacrylic acid of total charge was not reacted.

TABLE 4

1H, 13C NMR spectra and peak assignments for 3-(2-(2-butoxyethoxy)ethoxy)-2-hydroxypropyl methacrylate

| 1H NMR | |
|---|---|
| Peaks (in ppm) | Assigned, appearance |
| 3.90 | 1H, b |
| 13C NMR | |
| Peaks (in ppm) | Assigned |
| 168.2 | 1C |

As shown in Table 4, above, a 1H NMR Peak in at 3.90 ppm is associated with the proton of a β-hydroxyl group of the product. 13C NMR Peaks in shown in Table 4 at 168.2 ppm confirm the carbonyl carbon of ester product.

TABLE 5

Mass spectroscopy analysis 3-(2-(2-butoxyethoxy)ethoxy)-2-hydroxypropyl methacrylate and Byproducts Showing Branching at the β-hydroxy carbon to add an alkyl polyether

| Molecular ions | Molecular mass |
|---|---|
| MNa+ | 327.2 |
| Dimer-Na+ | 545.4 |
| Trimer-Na+ | 763.6 |

A sample of 3-(2-(2-butoxyethoxy)ethoxy)-2-hydroxypropyl methacrylate of Synthesis Example 2 was characterized by MALDI mass spectrometry. Mass spectroscopy data shows a sodiated molecular ion (MNa+) peak at 327.2 for 3-(2-(2-butoxyethoxy)ethoxy)-2-hydroxypropyl methacrylate. It appears that a β-hydroxyl group of 3-(2-(2-butoxyethoxy)ethoxy)-2-hydroxypropyl methacrylate further reacts with 2-((2-(2-butoxyethoxy)ethoxy)methyl)oxirane to form a dimer or trimer. The peaks of side products at 545.4 and 763.6 are assigned to these dimer or trimers.

SYNTHESIS EXAMPLE 3

Polymethacrylic Acid (pMAA) Grafted Diethylene Glycolmonobutyl Ether 100 g of poly(methacrylic acid) (pMAA) at ambient pH, having an acid no. of 253 was mixed with 10.82 g of NaOH solution (aq. 50% solids w/w) to make a solution of partially neutralized pMAA. 5.54 g of the solution was mixed with 4.06 g water in a glass vial with a magnetic stirrer. 1.48 g of 2-((2-(2-butoxyethoxy)ethoxy)methyl)oxirane was added to this mixture under stirring. The stirring was continued at room temperature and after 5 h when both phases are miscible and formed a homogenous mixture. The vial was heated in preheated oven at 60° C. for 72 h. After 72 h, the vial was cooled to room temperature and the reaction mixture was characterized.

TABLE 6

13C NMR Spectra And Peak Assignments For pMAA Grafted Diethylene Glycolmonobutyl Ether

13C NMR

| Peaks (in ppm) | Assigned |
|---|---|
| 178.4 | 1C (-carbonyl group of ester) |

The 13C NMR Peaks in shown in Table 6, above, at 178.4 ppm evidence a carbonyl carbon of an ester as a product.

Diethylene glycolmonobutyl ether grafted pMAA was also analyzed using size exclusion chromatography followed with mass spectrometry. This method examines different grafted polymer chains eluting at different time intervals to get an overall picture of the polymeric product. The data showed in Tables 7, 8 and 9, below, are the deprotonated molecular ion peaks observed for grafted polymer chains eluted at different time intervals.

Molecular ion peaks for the polymer fraction eluted at 13.8-14 min are listed in Table 7, below. These molecular ion peaks are single charge ions. For each given molecular mass, the number listed in first column denotes the number of methacrylic acid units, and the number in the first row denotes the number of 2-((2-(2-butoxyethoxy)ethoxy)methyl)oxirane groups and terminal group on the polymer chain. Since sodium hypophosphite is used as chain transfer agent, the terminal group was a hypophosphite group. The peak observed at m/z 541.3 can be assigned to 3 units of methacrylic acid (mol wt 86.06) and 1 unit of 2-((2-(2-butoxyethoxy)ethoxy)methyl)oxirane (mol wt 218.28) (Calculation: 3*86+1*218.3+64.9=541.2). Similarly, the peak observed at 627.3 can be assigned to assigned to 4 units of methacrylic acid and 1 unit of 2-((2-(2-butoxyethoxy)ethoxy) methyl)oxirane (Calculation: 4*86+1*218.3+64.9=627.3).

TABLE 7

Single Charged (Z = 1) Molecular Ion Peaks Observed For Polymer Eluted At 13.8-14 Min

| Number of MAA units | Number of 2-((2-(2-butoxyethoxy)ethoxy)methyl)oxirane units | | |
|---|---|---|---|
| | 0 | 1 | 2 |
| 2 | — | 455.2 | |
| 3 | — | 541.3 | 759.4 |
| 4 | 409.1 | 627.3 | 845.4 |
| 5 | 495.2 | 713.3 | 931.5 |
| 6 | 581.2 | 799.4 | — |
| 7 | 667.2 | 885.4 | — |

The molecular ion peaks for the polymer fraction from synthesis Example 3 eluted at 13.6-13.8 min are listed in Table 8, below. These molecular ion peaks are double charged ions therefore the number listed in table denotes m/z value where z=2. Therefore the peak observed at m/z 551.3 denotes the molecular mass of 1102.3 and can be assigned to assigned to 7 units of methacrylic acid (mol wt 86.06) and 2 unit of 2-((2-(2-butoxyethoxy)ethoxy)methyl)oxirane units (mol wt 218.28).

TABLE 8

Double Charged (Z = 2) Molecular Ion Peaks Observed For Polymer Eluted At 13.6-13.8 Min

| Number of MAA units | Number of 2-((2-(2-butoxyethoxy)ethoxy)methyl)oxirane units | | |
|---|---|---|---|
| | 1 | 2 | 3 |
| 6 | 399.2 | — | |
| 7 | 442.2 | 551.3 | — |
| 8 | 485.2 | 594.3 | 703.4 |
| 9 | 528.2 | 637.3 | 746.4 |
| 10 | 571.3 | 680.3 | 789.4 |
| 11 | 614.3 | 723.3 | 832.4 |
| 12 | 657.3 | 766.4 | 875.4 |
| 13 | 700.3 | 809.4 | 918.5 |
| 14 | 743.3 | 852.4 | 961.5 |
| 15 | 786.3 | 895.4 | 1004.5 |
| 16 | 829.4 | 938.4 | 1047.5 |
| 17 | 872.4 | 981.5 | — |

The molecular ion peaks for the polymer fraction from Synthesis Example 3, eluted at 13.4-13.6 min, are listed in Table 9, below. These molecular ion peaks are triple charge ions therefore the number listed in table denotes m/z value where z=3.

TABLE 9

Triple charged (z = 3) molecular ion peaks observed for polymer eluted at 13.4-13.6 min

| Number of MAA units | Number of 2-((2-(2-butoxyethoxy)ethoxy)methyl)oxirane units | | | |
|---|---|---|---|---|
| | 1 | 2 | 3 | 4 |
| 16 | — | 625.3 | — | — |
| 17 | — | 654 | — | — |
| 18 | — | 682.7 | 755.4 | — |
| 19 | — | 711.3 | 784 | — |
| 20 | 667.3 | 740 | 812.7 | — |
| 21 | 696 | 768.7 | 841.4 | 914.1 |
| 22 | — | 797.4 | 870.1 | 942.8 |
| 23 | — | 826 | 898.8 | 971.5 |
| 24 | — | 854.7 | 927.4 | — |

As shown in Tables 7, 8 and 9, above, as the number of repeating units in reactant b) pMAA chains increases the corresponding number of glycidol ether units also increases. Table 10, below, shows the molecular weight difference between unreacted pMAA and pMAA reacted with 2-((2-(2-butoxyethoxy)ethoxy)methyl)oxirane. The apparent weight average molecular weight of pMAA was increased to $1.357 \times 10^4$ g/mol after reaction showing the increase in molecular size upon incorporation of 2-((2-(2-butoxyethoxy)ethoxy) methyl)oxirane units.

TABLE 10

Molecular Weights Of pMAA Before And After Reaction With 2-((2-(2-Butoxyethoxy)Ethoxy)Methyl)Oxirane

| | Mw | Mn |
|---|---|---|
| pMAA before reaction | $5.710 \times 10^3$ g/mol | $2.000 \times 10^3$ g/mol |
| pMAA after reaction | $1.357 \times 10^4$ g/mol | $2.253 \times 10^3$ g/mol |

The molecular weights shown in Table 10, above, are relative molecular weights determined using polystyrene standards. However the difference in weight average molecular weights of pMAA before and after reaction can be used to estimate approximate number of diethylene glycol butyl ether repeat units in the product water soluble copolymer. The difference in weight average molecular weight is $1.357 \times 10^4 - 5.710 \times 10^3 = 7860$. The mol wt of 2-((2-(2-butoxyethoxy)ethoxy)methyl)oxirane is 218.28. Therefore, the number of repeat units is approximately 36 units (7860/218.28=36).

We claim:

1. A composition comprising a β-hydroxy propyl polyether functional resin chosen from a water soluble copolymer of, in polymerized form, a β-hydroxy propyl gamma-polyoxyalkylene ether (meth)acrylate, a water soluble copolymer of, in polymerized form, a β-hydroxy propyl gamma-polyoxyalkylene ether maleate, a water soluble copolymer of, in polymerized form, a β-hydroxy propyl gamma-polyoxyalkylene ether itaconate, an alkali soluble copolymer of, in polymerized form, a β-hydroxy propyl gamma-polyoxyalkylene ether (meth)acrylate, an alkali soluble copolymer of, in polymerized form, a β-hydroxy propyl gamma-polyoxyalkylene ether maleate, and an alkali soluble copolymer of, in polymerized form, a β-hydroxy propyl gamma-polyoxyalkylene ether itaconate, and mixtures thereof, wherein the copolymer contains in polymerized form an addition polymerizable monomer having (i) a carboxyl functional group or its salt, or (ii) two carboxyl functional groups, their salts or anhydrides.

2. The composition as claimed in claim 1, wherein the resin is a water soluble or alkali soluble copolymer having a weight average molecular weight of from 1,000 to 250,000.

3. The composition as claimed in claim 2, wherein the water soluble copolymer or alkali soluble copolymer is a carboxylate anion containing copolymer.

4. The composition as claimed in claim 1, wherein the β-hydroxy propyl gamma-polyoxyalkylene ether functional (meth)acrylate, maleate or itaconate has a structure of formula I

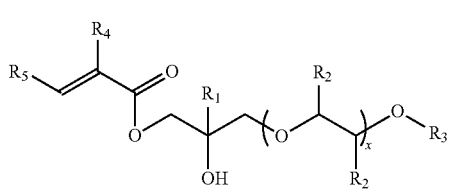

wherein $R_1$ is hydrogen, 1 to 4 carbon alkyl or phenyl; each $R_2$ is independently hydrogen, 1 to 4 carbon atom alkyl, or an oxyalkylene radical of formula II;

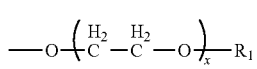

$R_3$ is hydrogen, 1 to 50 carbon alkyl, benzyl ($C_7H_7$), or alkylbenzyl; $R_4$ is hydrogen, methyl, —$CH_2COOH$, or methylene carboxyl salt; and $R_5$ is hydrogen, carboxyl, —C(O)$NH_2$ or metal carboxylate salts; and x is from 1 to 200.

5. The composition as claimed in claim 4, wherein the resin is a water soluble copolymer or alkali soluble copolymer comprising the addition polymerization product of a mixture of a monomer of formula I with one or more addition polymerizable carboxyl functional monomer or its salt.

6. The composition as claimed in any preceding claim, which is an aqueous composition.

7. A method of making a β-hydroxy propyl gamma-polyoxyalkylene ether functional resin comprising reacting in water or aqueous solvent one or more reactant
   a) i) the reaction product of epihalohydrin, with one or more of a glycol, oligoglycol, glycol alkyl ether, polyglycol alkyl ether, glycol alkyl aryl ether, polyglycol alkyl aryl ether, glycol aryl ether or polyglycol aryl ether, or ii) a glycidyl alkyl ether, glycidyl alkyl polyether, glycidyl aryl ether or glycidyl aryl polyether
   with one or more reactant
   b) a carboxylate anion containing vinyl compound or polymer,
   wherein in reactant a) the alkyl group can have from 1 to 50 carbon atoms, and the aryl group can be aryl or alkylaryl having from 5 to 40 carbon atoms.

8. The method as claimed in claim 7, wherein the carboxylate anion containing vinyl compound or polymer is formed by adding a base to a carboxyl group containing vinyl compound or polymer in water or aqueous solvent.

9. The method as claimed in claim 8, wherein reactant b) is a carboxylate anion containing polymer chosen from polyacrylic acid, polymethacrylic acid, polymaleic acid, poly(itaconic acid), copolymers thereof, and salts of any of these.

\* \* \* \* \*